US006763039B1

(12) United States Patent
Kroemer et al.

(10) Patent No.: US 6,763,039 B1
(45) Date of Patent: Jul. 13, 2004

(54) METHOD AND ARRANGEMENT FOR LOCATING A SYNCHRONIZATION SEQUENCE IN A SERIAL BIT STREAM

(75) Inventors: Bernhard Kroemer, Fuerstenfeldbruck (DE); Karsten Laubner, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 738 days.

(21) Appl. No.: 09/715,720

(22) Filed: Nov. 17, 2000

(30) Foreign Application Priority Data

Nov. 17, 1999 (DE) ........................................ 199 55 329

(51) Int. Cl.[7] .................................................. H04J 3/06
(52) U.S. Cl. ...................................... 370/509; 370/520
(58) Field of Search .......................... 370/252, 503–512, 370/520

(56) References Cited

U.S. PATENT DOCUMENTS

| | | | | |
|---|---|---|---|---|
| 5,646,947 A | * | 7/1997 | Cooper et al. ............... | 370/510 |
| 5,666,366 A | * | 9/1997 | Malek et al. ................ | 370/505 |
| 5,717,761 A | * | 2/1998 | Yatagai ....................... | 380/261 |
| 6,542,563 B1 | * | 4/2003 | Shoji ........................... | 375/366 |
| 6,570,935 B1 | * | 5/2003 | Sugita ......................... | 375/324 |

* cited by examiner

Primary Examiner—Steven H. D Nguyen
Assistant Examiner—Robert Stevens
(74) Attorney, Agent, or Firm—Morrison & Foerster, LLP

(57) ABSTRACT

A method for locating a synchronization sequence S having a length s in a serial bit stream, and an arrangement for the implementation of such a method make use of the fact that the synchronization sequence S is composed of a plurality of individual words A, B, C having respective lengths a, b, c. The search in the serial bit stream relates only to a word length a, b, c and not to the entire length s of the synchronization sequence S. When a word A, B, C has been recognized, the expected value for the search for the next word A, B, C is set by a controller. The expected values for the words A, B, C to be searched are programmable and thus can be freely defined for each application, so they can be selected in an application-specific manner. The words A, B, C to be searched can be characterized by two auxiliary bits Z whose formation is exactly inverted relative to that of normal data words A, B, C. This guarantees an unambiguous and dependable recognition of these words A, B, C.

11 Claims, 2 Drawing Sheets

| S | | | |
|---|---|---|---|
| A = 2F6 | A = 2F6 | B = 228 | B = 248 |
| 10\|1111\|0110 | 10\|1111\|0110 | 10\|0010\|1000 | 10\|0100\|1000 |

METHOD AND ARRANGEMENT FOR LOCATING A SYNCHRONIZATION SEQUENCE IN A SERIAL BIT STREAM

BACKGROUND OF THE INVENTION

1. Field of the Invention

The present invention is directed to a method for locating a synchronization sequence S having a length s in a serial bit stream, and an arrangement for the implementation of such a method.

2. Description of the Prior Art

In many instances, the transmission of digital data requires a frame structure of the data. In order to save connecting lines, no frame start signal is transmitted given the transmission of the data from ASIC to ASIC. The receiver ASIC must then determine the frame start from the data stream.

For locating an n-bit long synchronization sequence in a serial bit stream, it is known to search bit-by-bit in the serial data and to undertake a comparison to the entire synchronization sequence. This requires a high realization outlay with a high logic depth and a long latent time until the recognition of the word boundary in the data stream.

SUMMARY OF THE INVENTION

An object of the invention is to provide a method and a computer-readable data carrier available with which a synchronization sequence can be located faster in a serial bit stream and with lower realization outlay, particularly less silicon area and lower dissipated power.

The above object is achieved in accordance with the principles of the present invention in a first version of a method for locating a synchronization sequence in a serial bit stream, wherein the synchronization sequence is defined as being composed of a first word with a prescribable first length and at least one second word with a prescribable second length, wherein a first comparison of the first word is undertaken to an arbitrary bit sequence of the serial bit stream having the first length, and jumping to a second repetition if the first word agrees with this bit sequence, executing a first repetition of the comparison of the first word to a bit sequence shifted by one bit compared to the previously compared bit sequence, if the first word does not agree with the previously compared bit sequence, executing a second repetition of the comparison of the first word to a bit sequence shifted by one bit relative to the previously checked bit sequence until a bit sequence shifted by the second length is checked, executing a first return jump to the second repetition as soon as coincidence is found in one of the executions of the second repetition, undertaking a second comparison as to whether the second word coincides with the bit sequence shifted by the second length, and executing a second return jump to the first repetition if no coincidence is found in the second comparison, and otherwise ending the method.

In a second version of the method, the synchronization sequence is defined as containing three or more words, and an additional execution is inserted for each further word between the step of the second return jump and the end, with each additional execution corresponding to the steps beginning with the second repetition up to and including the second return jump, but with a further word, having a further length, being used instead of the second word and the second length.

The inventive method makes it possible for the search in the serial bit stream to relate only to a word length a, b rather than to the entire length s of the synchronization sequence. When a word A, B has been recognized, the expected value for the search for the next word A, B is set by a controller. This method of word-by-word recognition offers several advantages. For example, only very short latent times are required until the recognition of the word boundaries in the data stream. Additionally, the realization outlay is lower compared to bit-by-bit recognition, since a shorter comparison sequence (only respectively one word) is used, which leads to less of a logic depth. Also, the expected values for the words A, B to be searched are programmable, and thus can be freely defined for each application, and thus can be selected in an application-specific manner. When an inventive method is implemented with an arrangement that comprises an integrated circuit, then silicon area and dissipated power are saved.

DESCRIPTION OF THE DRAWINGS

FIG. 1 is a synchronization sequence for the implementation of the inventive method.

DESCRIPTION OF THE PREFERRED EMBODIMENTS

Figure 2:
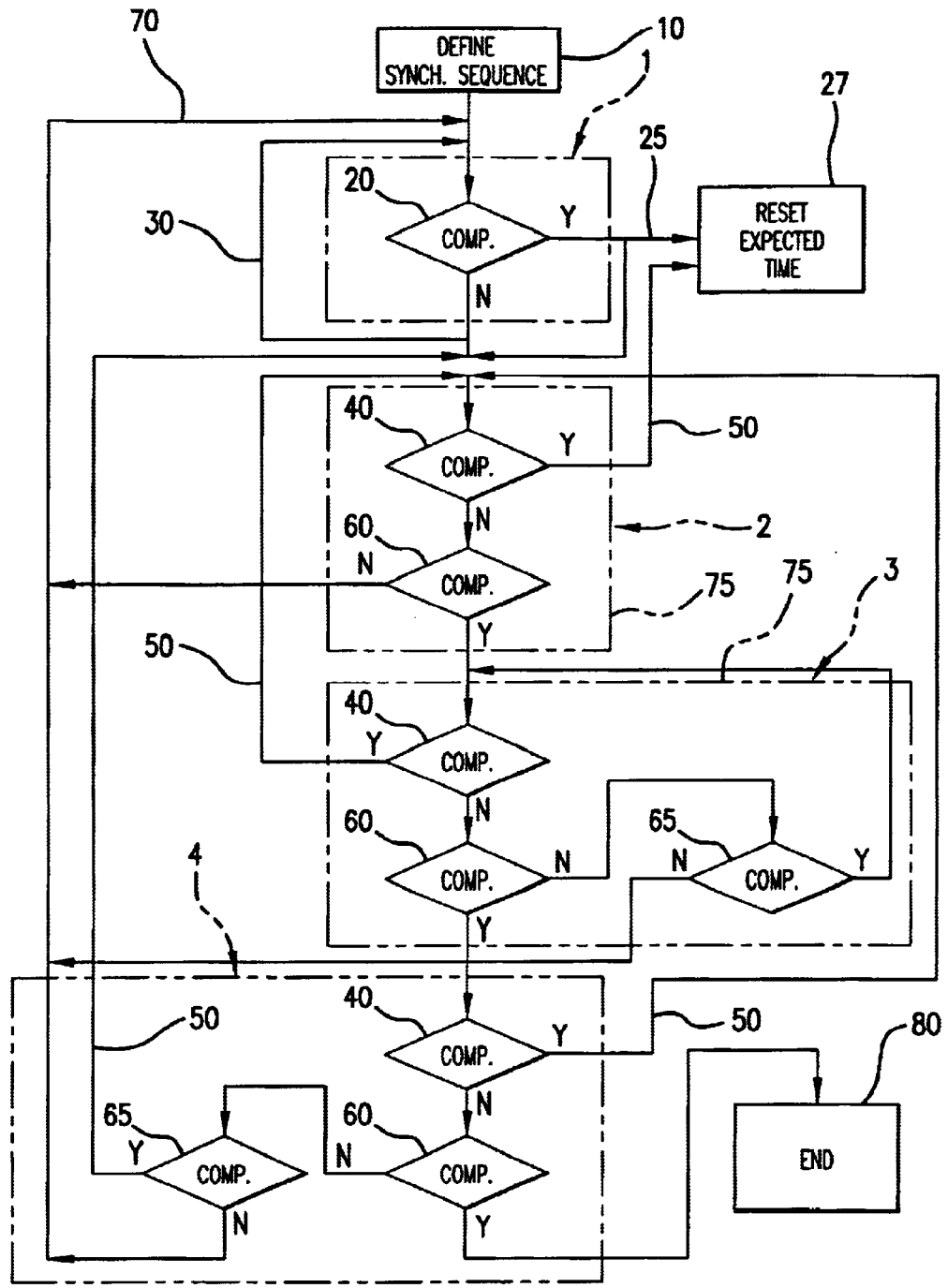
FIG. 2 is a flowchart of an inventive method.

A possible synchronization sequence S having the length s=40 and that is composed of four words A, A, B and C is shown in FIG. 1. Each of the words A, B, C is constructed of 10 bits, with the first two bits being auxiliary bits Z followed by two payload data N1, N2 that are each four bits long. The auxiliary bits Z are preferably fashioned as redundancy bits that are formed inverted relative to the payload data. A synchronization sequence S with this security measure is more difficult to interfere with from the outside since it is not possible to feed in the selected synchronization sequence into the prescribed word grid by intentionally supplying specific bit sequences. It is not compulsory that each of the words A, B, C have two redundancy bits Z. The attachment of redundancy bits Z is especially beneficial when redundancy data are appended for error monitoring in the data transmission on the word level (for example, ten-bit word width, eight payload bits N1, N2 and two parity bits therein).

The individual words A, A, B, C are written into loadable registers and thus can be freely defined. This allows identical hardware to be employed for different synchronization sequences. For example, it is quite easily possible to replace the fourth word C with a further word B. Silicon area of an integrated circuit that is a component of an arrangement for the implementation of an inventive method is saved by the repeated employment of a word. The dissipated power also is reduced. It is not only the individual words that can be programmed; but also the number of the respective words A, B, C that comprise the synchronization sequence S can also be programmed. Thus, for example, a circuit can select between two synchronization sequences having the structure AAAA or BBBB. The additional hardware outlay in this example is very low since either the comparator for the first word A or the comparator for the second word B must be selected in the search of the third and fourth word.

Given employment of more than two words A, B, C, however, it is advantageous in view of the simple implementation of the method that the first word A, when it occurs more than once in the synchronization sequence S, only resides at the start of this synchronization sequence. This means that no word deviating from A and B resides between the words A and B. Finding the word A is thereby interpreted as a possible start of the synchronization sequence S. All further words B, C are arranged in arbitrary sequence and frequency of occurrence.

It is also not compulsory that the individual words A, B, C all exhibit a length of ten bits; these can exhibit other lengths or even different lengths.

It is advantageous when the first word A and the synchronization sequence S are constructed such that the first word A does not identically occur within the synchronization sequence S when shifting the start bit by one bit in the synchronization sequence S up to the first length 'a' or a multiple thereof. As a result, the synchronization sequence S is dependably recognized from an arbitrary bit combination. When the word A is found outside the word grid in the word-by-word search, then this is a possible start for a synchronization sequence S.

The locating of the synchronization sequence S is an important aspect of the inventive method. Compared to the known methods, the word-by-word recognition offers a shorter latent time until the recognition of the word boundary in the data stream for synchronization sequences S that are composed of a number of individual words. When electronic circuits are realized according to this method, then silicon area and dissipated power are saved, particularly given multiply employed individual words A, B, C.

An inventive exemplary embodiment is described below on the basis of the flowchart from FIG. 2 for a synchronization sequence S that is constructed of the word sequence AABC. The individual words A, B and C are thereby constructed as shown in FIG. 1. This is, however, not the simplest embodiment of an inventive method. In order to realize this simplest embodiment, the two blocks 75, generally referenced 2 and 3 among four illustrated blocks 1, 2, 3, 4, are omitted, so that the first block 1 is directly connected to the fourth block 4 and the synchronization sequence S is composed only of the word sequence AC.

The exemplary embodiment of the invention shown in FIG. 2 begins with the definition 10 of the synchronization sequence S by writing the four words A, A, B, C into loadable registers. These are the ones shown in FIG. 2 and described above. The search for the first word A ensues in the first block 1. This occurs with a first comparison 20 of the first word A to an arbitrary bit sequence of the serial bit stream that exhibits the same length 'a' as the first word A, namely ten bits. If a match to the first word A is not found, then a first repetition 30 of the comparison of the first word A takes place, this time to a bit sequence of the serial bit stream shifted by one bit relative to the previously checked bit sequence. This is repeated until the checked bit sequence of the serial bit stream coincides with the first word A. When this is the case, then a reset 27 for the expected time control is made, i.e. the expected time for the next word of the synchronization sequence S—here, the word A again—is set to the length 'a' of the word A after a shift of the bit sequence of the serial bit stream. The expected times for the other words B and C are set to the lengths a+b, or a+b+c, in the same way. Second, a jump 25 ensues to the second block 2 in which a search is made for the second word A.

A second repetition 40 of the comparison of the first word A to a bit sequence of the serial bit stream just shifted by one bit compared to the respectively previously checked bit stream is thereby implemented. If the first word A is found before the expected time for the second word A, then a reset 27 for the anticipation time control occurs, as described above, since a new first word A was found at this location in the serial bit stream. Second, a first return jump 50 to the step of the second repetition 40 must therefore occur and thus, the block 2 must be run through again from the beginning. If no word A is found in the serial bit stream before the expected time, then a second comparison 60 occurs as to whether the second word A was found at the expected time. If this is not the case, then a second return jump 70 ensues to the step of the first repetition 30, and thus to the beginning of the block 1. Accordingly, the serial bit stream must then be searched again for the first word A.

If, however, the second word A is found at the expected time, then the search for the word B ensues in the third block 3. In this third block 3, as well, a second repetition 40 of the comparison of the first word A ensues with a bit sequence shifted by one bit compared to the respectively previously checked bit sequence until the bit sequence shifted by the third length 'b' was checked, this corresponding to the expected time of B. If the first word A was found before the expected time of B, then a first return jump 50 to the start of the second block 2 and a second repetition 40 ensue, as described above. If this is not the case, then a check is carried out to determine whether the third word B was found at the anticipation time of B, as was already described in the second block 2 for the second comparison 60. If this is not the case, then another check 65 ensues as to whether the first word A was found at the anticipation time of B. Otherwise a third return jump 67 to the start of the third block 3 occurs. This, however, only applies in this specific case, since the words A and B coincide in terms of their lengths a, b. If this were not the case, then a first return jump 50 to the start of the second block 2 would have to occur. In the exemplary embodiment, it is not necessary to jump back to the beginning of the second block 2 since the first two words agree with one another and thus the word A found in the second block 2 is interpreted as the first word A. When the word A is not found at the anticipation time of B, then a second return jump 70 to the start of the first block 1 occurs, and the first repetition 30, as explained above, is implemented.

When, by contrast, the third word B is found at the anticipation time of B, then a search for the fourth word C is made in a fourth block 4 of the method. By means of a second repetition 40 of the comparison of the first word A to a bit sequence shifted by one bit compared to the respectively previously checked bit sequence until the bit sequence shifted by the fourth length 'c' was checked, which corresponds to the anticipation time of C. When the first word A is found before the anticipation time of C, then this corresponds to an affirmation of the search for the first word A in block 1, and a first return jump 50 to the start of the block 2 and, as described above, a run through of this block 2 occur. If this is not the case, then a check 65 occurs as to whether the first word A was found at the anticipation time of C. When this is the case, this corresponds to locating the first word A in the first block 1, and a first return jump 50 to the start of the second block 2 occurs. As described, a search is then made for the second word A. If, however, neither the first word A nor the fourth word C is found at the expected time of C, then a second return jump 70 to the beginning of the first block 1 ensues, and thus a renewed search for the first word A, as described above. If, however, the fourth word C is found at the expected time of C, then the entire synchronization sequence S composed of the word sequence AABC has been found and a termination 80 of the method ensues.

The above-described method is advantageously stored as a computer program on a computer-readable data carrier.

Also preferred, the above-described method is realized as hardware (for example, in the form of an integrated circuit). As a result, extremely high bit rates can be processed.

The method is based on the fact that the synchronization sequence S is composed of a number of individual words A, B, C having the respective lengths a, b, c. The search in the serial bit stream respectively relates only to a word length a, b, c rather than to the entire length s of the synchronization sequence S. When a word A, B, C has been recognized, the anticipation value for the search for the next word A, B, C is set by a controller. This method of word-by-word recognition offers a number of advantages. For example, only very short latent times are required until the recognition of the word boundaries in the data stream. Also, the realization outlay is lower compared to bit-by-bit recognition, since a shorter comparison sequence (only one word) is used, which leads to less of a logic depth. Also, the expected values for the words A, B to be searched are programmable, thus can be freely defined for each application, and thus can be selected application-specific. Silicon area as well as dissipated power are saved with the inventive method. The words A, B, C to be searched are preferably characterized by two auxiliary bits Z whose formation is preferably exactly inverted relative to that of normal data words A, B, C. This guarantees an unambiguous and dependable recognition of these words A, B, C.

Although various minor modifications might be suggested by those skilled in the art, it should be understood that our wish to embody within the scope of the patent warranted hereon all such modifications as reasonably and properly come with the scope of our contribution to the art.

We claim as our invention:

1. A method for locating a synchronization sequence in a serial bit stream, comprising the steps of:
   (a) defining said synchronization sequence as being composed of a first word with a prescribable first length, and at least one second word with a prescribable second length;
   (b) executing a first comparison of the first word to an arbitrary bit sequence of said serial bit stream having said first length, and jumping to Step (d) below if said first word agrees with said bit sequence;
   (c) executing a first repetition of the comparison of the first word to a bit sequence shifted by one bit relative to the bit sequence compared in Step (b) if said first word does not agree with said bit sequence in Step (b);
   (d) executing a second repetition of the comparison of the first word to a bit sequence shifted by one bit compared to the bit sequence compared in Step (c) until a bit sequence that has been shifted by said second length is compared;
   (e) executing a first return jump to Step (d) as soon as coincidence is found in an execution of said second repetition;
   (f) executing a second comparison as to whether said second word coincides with said bit sequence shifted by said second length; and
   (g) executing a second return jump to Step (c) and repeating said first repetition if no coincidence is found in Step (f), and otherwise terminating said method.

2. A method as claimed in claim 1 wherein Step (a) comprises defining said synchronization sequence as being composed of a first word with a prescribable first length, a second word with a prescribable second length, and at least one further word with a prescribable further length; and
   for each further word, inserting an additional step between said second return jump and terminating said method, with each said additional execution including the steps of executing said second repetition up to and including said second return jump and using said further word and said further length in each said execution instead of said second word and said second length.

3. A method as claimed in claim 1 comprising defining said synchronization sequence so that said first word does not identically occur upon shifting of a start bit of said sequence by one bit up to said first length and multiples of said first length.

4. A method as claimed in claim 1 comprising defining said first word to be present only at a start of said synchronization sequence.

5. A method as claimed in claim 1 comprising defining said synchronization sequence so that said first word is present repeatedly in succession at a start of said synchronization sequence without another word existing between repeated occurrences of said first word.

6. A method as claimed in claim 1 wherein said first length and said second length are equal.

7. A method as claimed in claim 6 wherein each of said first length and said second length are 10 bits.

8. A method as claimed in claim 1 wherein said first word and said second word are freely definable.

9. A method as claimed in claim 1 wherein at least one of said first word and said second word comprises at least two auxiliary bits.

10. A method as claimed in claim 8 comprising forming said auxiliary bits to be inverted relative to the word which contains the auxiliary bits.

11. A arrangement for locating a synchronization sequence in a serial bit stream, comprising the steps of:
   means for defining said synchronization sequence as being composed of a first word with a prescribable first length, and at least one second word with a prescribable second length;
   means for executing a first comparison of the first word to an arbitrary bit sequence of said serial bit stream having said first length, and jumping to execute a second repetition if said first word agrees with said bit sequence;
   means for executing a first repetition of the comparison of the first word to a bit sequence shifted by one bit relative to the bit sequence compared in said means for executing a first comparison if said first word does not agree with said bit sequence;
   means for executing said second repetition of the comparison of the first word to a bit sequence shifted by one bit compared to the bit sequence compared in said means for executing a first repetition until a bit sequence that has been shifted by said second length is compared;
   means for executing a first return jump to execute said second repetition as soon as coincidence is found in an execution of said second repetition;
   means for executing a second comparison as to whether said second word coincides with said bit sequence shifted by said second length; and
   means for executing a second return jump to execute said first repetition and for repeating said first repetition if no coincidence is found in said second comparison, and for otherwise terminating location of said synchronization sequence.

* * * * *